United States Patent
Tsuji et al.

(10) Patent No.: US 10,384,282 B2
(45) Date of Patent: *Aug. 20, 2019

(54) ELECTRIC DISCHARGE MACHINING ELECTRODE WIRE AND MANUFACTURING METHOD THEREFOR

(71) Applicant: Hitachi Metals, Ltd., Tokyo (JP)

(72) Inventors: Takayuki Tsuji, Kitaibaraki (JP); Hiromitsu Kuroda, Hitachi (JP); Tetsuya Tokumitsu, Hitachi (JP); Takamitsu Kimura, Hitachi (JP); Yosuke Shiba, Hitachi (JP); Hiroshi Matsuzaki, Hitachi (JP); Yuichi Komuro, Hitachi (JP); Shingo Amamiya, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 15/122,112

(22) PCT Filed: Jan. 7, 2015

(86) PCT No.: PCT/JP2015/050276
§ 371 (c)(1),
(2) Date: Aug. 26, 2016

(87) PCT Pub. No.: WO2016/110963
PCT Pub. Date: Jul. 14, 2016

(65) Prior Publication Data
US 2017/0072489 A1 Mar. 16, 2017

(51) Int. Cl.
*B23H 7/08* (2006.01)
*C22C 9/04* (2006.01)
(Continued)

(52) U.S. Cl.
CPC ............ *B23H 7/08* (2013.01); *B23K 35/0227* (2013.01); *B23K 35/0244* (2013.01);
(Continued)

(58) Field of Classification Search
CPC ... B23H 7/08; B23H 7/24; B23H 1/04; B23H 1/06; C22C 9/04; C22C 18/02; C22F 1/08;
(Continued)

(56) References Cited

U.S. PATENT DOCUMENTS 4,226,621 A * 10/1980 Ruchel ..................... C22C 9/04
148/413
5,762,726 A 6/1998 Barthel et al.
(Continued)

FOREIGN PATENT DOCUMENTS

CN 104191056 A 12/2014
EP 0 733 431 A1 9/1996
(Continued)

OTHER PUBLICATIONS

English Translation of the Written Opinion of the International Searching Authority (PCT/IB/310) in PCT Application No. PCT/JP2015/050276 dated Nov. 11, 2016.
(Continued)

*Primary Examiner* — Christopher S Kim
(74) *Attorney, Agent, or Firm* — McGinn I. P. Law Group, PLLC.

(57) ABSTRACT

An electrical discharge machining electrode wire includes a core including a copper or a copper alloy, and a covering layer that covers a periphery of the core and includes a zinc. The covering layer includes an outermost layer consisting of an ε-phase of a copper-zinc based alloy. The outermost layer has a Vickers hardness of 200 to 300 Hv.

13 Claims, 3 Drawing Sheets

(51) Int. Cl.
  *C22F 1/16* (2006.01)
  *B23K 35/02* (2006.01)
  *B23K 35/30* (2006.01)
  *B23K 35/40* (2006.01)
  *C22C 18/00* (2006.01)

(52) U.S. Cl.
  CPC .......... *B23K 35/302* (2013.01); *B23K 35/404* (2013.01); *C22C 9/04* (2013.01); *C22F 1/165* (2013.01); *C22C 18/00* (2013.01)

(58) Field of Classification Search
  CPC .. C22F 1/165; C25D 3/22; C25D 5/50; C25D 7/0607
  USPC ........................................ 219/69.12, 69.15
  See application file for complete search history.

(56) References Cited

U.S. PATENT DOCUMENTS

| | | | |
|---|---|---|---|
| 6,447,930 B2 | 9/2002 | Barthel et al. | |
| 7,687,738 B2* | 3/2010 | Ly | B23H 7/08 219/69.11 |
| 7,723,635 B2* | 5/2010 | Shin | B23H 7/08 219/69.11 |
| 8,067,689 B2 | 11/2011 | Tomalin | |
| RE44,789 E | 3/2014 | Barthel et al. | |
| 2009/0025959 A1 | 1/2009 | Tomalin | |
| 2016/0368070 A1 | 12/2016 | Liang et al. | |
| 2017/0014927 A1* | 1/2017 | Tsuji | B23H 7/08 |
| 2017/0259361 A1 | 9/2017 | Tsuji | |

FOREIGN PATENT DOCUMENTS

| | | |
|---|---|---|
| JP | H 08-318434 A | 12/1996 |
| JP | 2002-126950 A | 5/2002 |
| JP | 2004-160655 A | 6/2004 |
| JP | 3549663 B2 | 8/2004 |
| JP | 2008-296298 A | 12/2008 |
| KR | 10-2016-0091376 A | 8/2016 |
| WO | WO 2016/072033 A1 | 5/2016 |

OTHER PUBLICATIONS

Extended European Search Report dated Aug. 31, 2017 in European Application No. 15876841.6.
Korean Office Action dated Dec. 15, 2017 in Korean Application No. 10-2016-7023768 with an English translation thereof.
International Search Report (ISR) (PCT Form PCT/ISA/210), in PCT/JP2015/050276, dated Apr. 14, 2015.
United States Office Action dated May 16, 2018 in U.S. Appl. No. 15/122,081.
United States Office Action dated Oct. 9, 2018 in co-pending U.S. Appl. No. 15/122,081.
United States Office Action dated Feb. 22, 2019 in U.S. Appl. No. 15/122,081.
United States Notice of Allowance dated Apr. 19, 2019 in U.S. Appl. No. 15/122,081.

* cited by examiner

ELECTRIC DISCHARGE MACHINING ELECTRODE WIRE AND MANUFACTURING METHOD THEREFOR

TECHNICAL FIELD

The present invention relates to an electrical discharge machining electrode wire and a method of manufacturing the same.

BACKGROUND ART

Electrical discharge machining electrode wires having a zinc coating around a core formed of copper or a copper alloy (see, e.g., PTLs 1 to 4) are advantageous in that surface finish of a processed portion of a workpiece is better than when using electrical discharge machining electrode wires provided with only a core formed of copper or a copper alloy.

CITATION LIST

Patent Literature

[PTL 1]
JP-A-2002-126950
[PTL 2]
JP-A 2008-296298
[PTL 3]
JP-B-3549663
[PTL 4]
U.S. Pat. No. 8,067,689

SUMMARY OF INVENTION

Technical Problem

However, in case of electrical discharge machining electrode wires having the outermost surface layer including a η-phase (Zn), the outermost surfaces are soft. Therefore, wear debris is likely to be produced in a pass line, e.g., on a pulley or a die, during electrical discharge machining, and the wear debris adhered to the outermost surfaces of the electrical discharge machining electrode wires causes abrasion of the zinc coatings. Meanwhile, in case of electrical discharge machining electrode wires having the outermost surface layer including a γ-phase ($Cu_5Zn_8$), the outermost surface is hard and wear debris is less likely to be produced, but the electrode wires are brittle and are likely to be broken when setting the electrode wires on an electrical discharge machine.

Thus, it is an object of the invention to provide an electrical discharge machining electrode wire that has a zinc covering at a periphery of a core, that produces and leaves less wear debris in a pass line such as on a pulley or a die during electrical discharge machining, and that is also improved to be less brittle, as well as a method of manufacturing the electrical discharge machining electrode wire.

Solution to Problem

To achieve the above-mentioned object, the invention provides an electrical discharge machining electrode wire and a method of manufacturing the same described below.

[1] An electrical discharge machining electrode wire comprising: a core comprising a copper or a copper alloy; and a covering layer that covers a periphery of the core and comprises a zinc, wherein the covering layer comprises an outermost layer consisting of an ε-phase of a copper-zinc based alloy, and the outermost layer has a Vickers hardness of 200 to 300 Hv.

[2] The electrical discharge machining electrode wire defined by [1], wherein 0.2% proof stress is not less than 985 MPa.

[3] The electrical discharge machining electrode wire defined by [1] or [2], wherein the covering layer further comprises an inner layer including a γ-phase of a copper-zinc based alloy.

[4] The electrical discharge machining electrode wire defined by [3], wherein an x-ray diffraction intensity of (0001) of the ε-phase in the covering layer is more than twice an x-ray diffraction intensity of (332) of the γ-phase in the covering layer.

[5] The electrical discharge machining electrode wire defined by any one of [1] to [4], wherein the outermost layer has a Vickers hardness of 260 to 300 Hv.

[6] The electrical discharge machining electrode wire defined by any one of [1] to [5], wherein the core comprises a brass.

[7] A method of manufacturing an electrical discharge machining electrode wire, wherein the electrode wire comprises a core comprising a copper or a copper alloy and a covering layer that covers a periphery of the core and comprises a zinc, the method comprising: plating once the periphery of the core with a zinc or a zinc alloy, drawing the plated core; and after the drawing, conducting a heat treatment under such heat treatment conditions that the covering layer comprises an outermost layer consisting of an ε-phase of a copper-zinc based alloy and the outermost layer has a Vickers hardness of 200 to 300 Hv.

[8] The method of manufacturing an electrical discharge machining electrode wire defined by [7], wherein the heat treatment conditions are a heat treatment temperature of 100 to 120° C. and a heat treatment time in a range of 3 to 24 hours.

Advantageous Effects of Invention

According to the invention, an electrical discharge machining electrode wire can be provided that has a zinc covering at a periphery of a core, that produces and leaves less wear debris during electrical discharge machining, and that is also improved to be less brittle, as well as a method of manufacturing the electrical discharge machining electrode wire.

DESCRIPTION OF EMBODIMENT

[Electrical Discharge Machining Electrode Wire]

Figure 1:
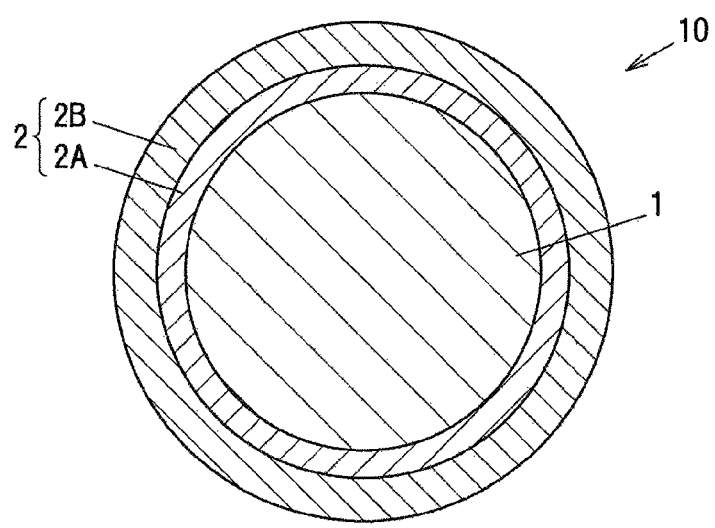
FIG. 1 is a cross sectional view showing a structure of an electrical discharge machining electrode wire in an embodiment of the present invention.

FIG. 1 is a cross sectional view showing a structure of an electrical discharge machining electrode wire in an embodiment of the invention.

An electrical discharge machining electrode wire 10 in the embodiment of the invention shown in FIG. 1 is provided with a core 1 formed of copper or a copper alloy and a zinc-including covering layer 2 covering the periphery thereof, and is characterized in that the covering layer 2 has an outermost layer 2B consisting of only an ε-phase copper-zinc alloy, and the outermost layer 2B has a Vickers hardness of 200 to 300 Hv. The outermost layer 2B constituting the covering layer 2 is a surface layer of the electrical discharge machining electrode wire 10.

The 0.2% proof stress of the electrical discharge machining electrode wire 10 in the present embodiment is preferably not less than 985 MPa, more preferably not less than 990 MPa. The upper limit of the 0.2% proof stress is not specifically set, but not more than 1025 MPa is preferable.

The core 1 is formed of copper or a copper alloy. The copper alloy is not specifically limited but is preferably brass.

The zinc-including covering layer 2 provided around the core 1 is formed by applying a zinc plating or a zinc alloy plating. The zinc plating is preferable.

The covering layer 2 has at least the outermost layer 2B which is formed of only an ε-phase copper-zinc alloy. The ε-phase is a Cu—Zn alloy generally expressed by CuZn₅ and having a Cu content of about 24 to 12 mass % and a Zn content of about 76 to 88 mass %. The ε-phase is not in the form of islands but is formed as a layer covering the entire circumferential surface of the core.

The outermost layer 2B is formed to have a Vickers hardness of 200 to 300 Hv when measured by pressing the electrode wire from the surface toward the core at a load of 50 g. When the value of Vickers hardness is not less than 200 Hv, wear debris produced during electrical discharge machining can be reduced. The larger the value of Vickers hardness is, the higher the effect of reducing formation of wear debris is. Therefore, the Vickers hardness of the outermost layer 2B (the lower limit) is preferably not less than 220 Hv, more preferably not less than 240, and further preferably not less than 260 Hv. Meanwhile, when the value of Vickers hardness is not more than 300 Hv, brittleness is improved and wire breakage is less likely to occur. Therefore, the Vickers hardness of the outermost layer 2B (the upper limit) is preferably not more than 290 Hv, more preferably not more than 280 Hv.

The covering layer 2 may have another layer including zinc and located on the inner side of the outermost layer 2B, and preferably has, e.g., an inner layer 2A including a γ-phase copper-zinc alloy. The γ-phase is a Cu—Zn alloy generally expressed by Cu₅Zn₈ and having a Cu content of about 45 to 35 mass % and a Zn content of about 55 to 65 mass %. As for the inner layer 2A including the γ-phase, the amount of the γ-phase included in the inner layer is preferably not less than 85 mass %, more preferably not less than 90 mass %, further preferably not less than 95 mass %, and most preferably 100 mass %.

The inner layer 2A constituting the covering layer 2 may be composed of two or more layers. A layer formed of a β-phase copper-zinc alloy and a layer formed of a η-phase pure zinc are preferably absent but may be present as long as the effects of the invention are exerted.

The covering layer 2 is preferably formed so that the x-ray diffraction intensity of (0001) of the ε-phase in the covering layer 2 is more than twice the x-ray diffraction intensity of (332) of the γ-phase in the covering layer 2. In the present embodiment, all or most of the ε-phase in the covering layer 2 is present in the outermost layer 2B, and all of the γ-phase in the covering layer 2 is present in the inner layer 2A. The x-ray diffraction intensity of (0001) of the ε-phase is preferably not less than 3 times, more preferably, not less than 4 times the x-ray diffraction intensity of (332) of the γ-phase. There is no specific upper limit but not more than 20 times is preferable. The x-ray diffraction intensities used for comparison are the peak intensities measured by a thin-film method (a method in which an incident x-ray beam is fixed at a small angle (e.g., 10°) to reduce an incident depth of X-ray beam to the extent that the x-ray beam is slightly incident on the core, thereby increasing sensitivity to analyze the surface layer).

The thickness of the covering layer 2 as a whole is preferably 1 to 20 μm. When the inner layer 2A is provided, the layer thickness ratio is preferably the outer layer 2B/the inner layer 2A=4/1 to 1/1.

[Method of Manufacturing Electrical Discharge Machining Electrode Wire]

A manufacturing method in the embodiment of the invention is to manufacture the electrical discharge machining electrode wire 10 formed by covering the core 1 comprising copper or a copper alloy with the zinc-including covering layer 2, and the method includes a step of plating the core 1 with zinc or a zinc alloy once, a step of drawing the plated core 1, and a step of performing post-wire-drawing heat treatment with the heat treatment conditions adjusted so that the covering layer 2 has the outermost layer 2B consisting of only an ε-phase copper-zinc alloy and the outermost layer 2B has a Vickers hardness of 200 to 300 Hv.

The step of plating with zinc or a zinc alloy once and the wire drawing step can be performed by known methods.

The above-described electrical discharge machining electrode wire 10 in the embodiment of the invention can be obtained through the step of performing post-wire-drawing heat treatment. The heat treatment conditions are adjusted so that the outermost layer 2B described above can be formed preferably in the range of 100 to 120° C. and 3 to 24 hours, more preferably, 100 to 120° C. and 3 to 18 hours. The temperature and time of heat treatment are appropriately adjusted depending on the diameter of the electrode wire and the thickness of the covering layer. The heat treatment at, e.g., 100° C. is performed preferably for about 6 to 10 hours when the electrode wire has a diameter of Φ0.02 mm, and preferably for about 10 to 17 hours when the electrode wire has a diameter of Φ0.25 mm. Meanwhile, the heat treatment at, e.g., 100° C. is performed preferably for about 3 to 7 hours when the covering layer has a thickness of less than 1.5 μm, and preferably for about 7 to 18 hours when the covering layer has a thickness of not less than 1.5 μm.

According to the manufacturing method in the embodiment of the invention, the inner layer 2A constituting the covering layer 2 can be simultaneously formed in the above-described heat treatment step. By appropriately adjusting the heat treatment conditions, a covering layer can be formed so that the x-ray diffraction intensity of (0001) of the ε-phase in the covering layer 2 is more than twice the x-ray diffraction intensity of (332) of the γ-phase in the covering layer 2. In addition, it is possible to obtain the electrical discharge machining electrode wire 10 having a 0.2% proof stress of not less than 985 MPa.

[Effects of the Embodiment of the Invention]

The following effects are obtained in the embodiment of the invention.

(1) It is possible to provide an electrical discharge machining electrode wire which has a zinc coating around a core but produces and leaves less wear debris in a pass line such as on a pulley or a die during electrical discharge machining and is also improved to be less brittle, and also to provide a method of manufacturing such an electrical discharge machining electrode wire.

(2) The plating step is performed only once during manufacturing. Therefore, it is possible to provide an electrical discharge machining electrode wire with excellent productivity and a method of manufacturing the same.

Next, the invention will be described in reference to Examples. However, the invention is not limited to these Examples.

EXAMPLES

[Manufacturing of Electrical Discharge Machining Electrode Wire]

Using a zinc electroplating method, a zinc plating layer having a thickness of about 10 μm was formed on a brass wire (diameter: 1.2 mm) as the core 1. The core 1 plated with toward the core 1 at a load of 50 g. Then, an average value of randomly-selected three measurement points was derived.

The 0.2% proof stress was measured by a tensile test in which gauge marks with a gauge length of 100 mm were made on the surface of the electrical discharge machining electrode wire (the surface of the zinc plating layer), and the electrode wire was then pulled by a tensile testing machine at a tensile rate of 200 mm/min.

Also, the phase state of the covering layer (the outermost layer and the inner layer) was assessed by x-ray diffraction. The outermost layer consisting of only ε-phase was formed in all of Examples.

[Evaluation of Electrical Discharge Machining Electrode Wire]

The effect of reducing formation of wear debris and the brittleness improving effect were evaluated on the obtained electrical discharge machining electrode wires by the following methods. The evaluation results are shown in Table 1.

<Effect of Reducing Formation of Wear Debris>

Wool felts were placed to sandwich a traveling wire for 10 minutes at the time of rewinding the obtained electrode wire on a bobbin, and the amount of wear debris adhered to the felts was visually observed. The wires produced virtually no wear debris were regarded as ○ (Pass), the wires produced a small amount of wear debris were regarded as Δ (Fail), and the wires produced a large amount of wear debris were regarded as × (also Fail).

<Brittleness Improving Effect>

The setup process to set the obtained electrode wires on an electrical discharge machine was performed twenty times and the evaluation was conducted based on how the wires are less likely to be broken when being bent. The wires which were not broken were regarded as ○ (Pass), and the wires which were broken once or more times were regarded as × (Fail).

TABLE 1

| | Comparative Example 1 | Comparative Example 2 | Example 1 | Example 2 | Example 3 | Example 4 | Comparative Example 3 | Comparative Example 4 |
|---|---|---|---|---|---|---|---|---|
| Annealing temperature (° C.) | 80 | 100 | 100 | 100 | 120 | 120 | 160 | 160 |
| Annealing time (h) | 8 | 3 | 8 | 12 | 3 | 8 | 3 | 8 |
| Vickers hardness (Hv) | 100 | 180 | 260 | 280 | 280 | 300 | 315 | 330 |
| 0.2% proof stress (MPa) | 980 | 980 | 995 | 1000 | 1005 | 1020 | 960 | 950 |
| Outermost layer | η-phase | η- and ε-phase | ε-phase | ε-phase | ε-phase | ε-phase | ε- and γ-phase | γ-phase |
| Inner layer | ε-phase | ε-phase | γ-phase | γ-phase | γ-phase | γ-phase | γ-phase | γ-phase |
| Evaluation wear debris | X | Δ | ○ | ○ | ○ | ○ | ○ | ○ |
| brittleness | X | X | ○ | ○ | ○ | ○ | X | X |

η- and ε-phase: η-phase with an island-patterned ε-phase
ε- and γ-phase: ε-phase with an island-patterned γ-phase zinc was drawn to a diameter of 0.20 mm (to 1.7 μm of the plating layer), was then wound onto a bobbin (F10: spindle diameter of 100 mm), and was annealed in this state, thereby making 10 kg each of electrical discharge machining electrode wires. The annealing conditions are as shown in Table 1.

Vickers hardness and 0.2% proof stress were measured on the obtained electrical discharge machining electrode wires by the following methods. The measurement results are shown in Table 1.

Vickers hardness was measured as follows: each electrical discharge machining electrode wire was placed horizontally and a Vickers indenter was pressed against a point corresponding to the widthwise center of the electrode wire (the center of the core 1) from the surface of the zinc plating layer

[Measurement and Examination of 0.2% Proof Stress]

Figure 2A:
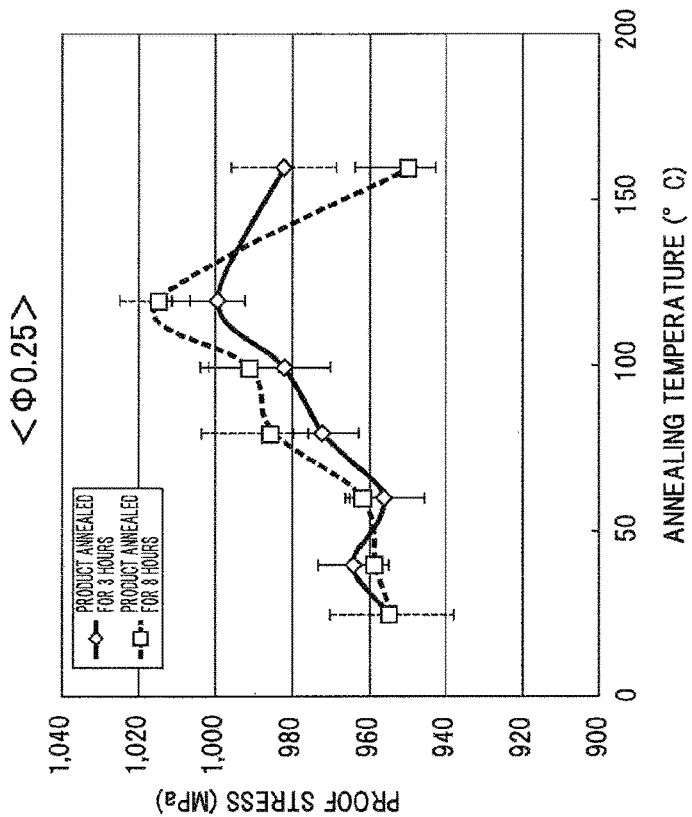
FIG. 2A is a graph showing the 0.2% proof stress measurement results of electrical discharge machining electrode wires (core diameter: 0.20 mm) made at different annealing times and annealing temperatures.
Figure 2B:
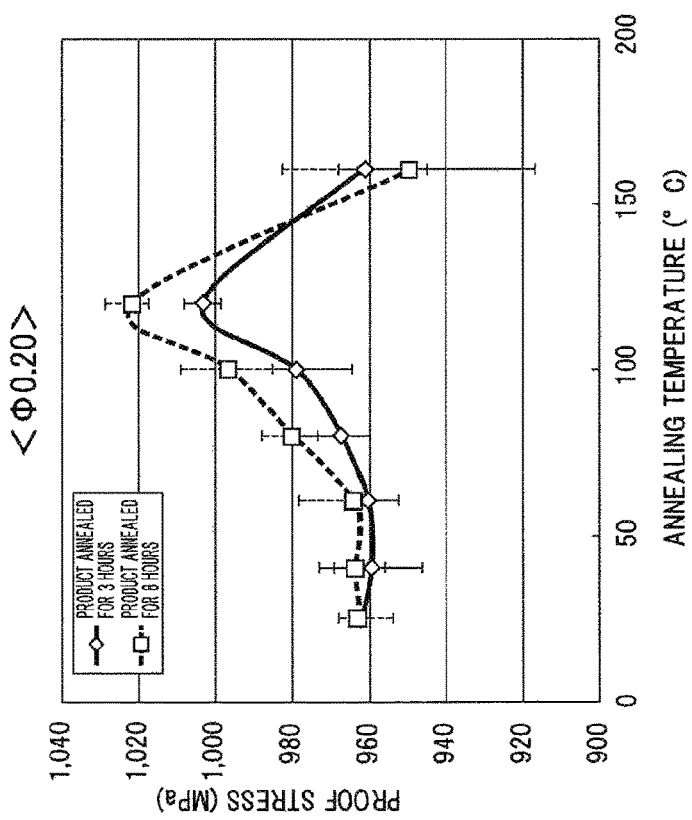
FIG. 2B is a graph showing the 0.2% proof stress measurement results of electrical discharge machining electrode wires (core diameter: 0.25 mm) made at different annealing times and annealing temperatures.

The electrical discharge machining electrode wires were made by the following method and subjected to 0.2% proof stress measurement. FIG. 2A is a graph showing the 0.2% proof stress measurement results of electrical discharge machining electrode wires (core diameter: 0.20 mm) made at different annealing times and annealing temperatures. FIG. 2B is a graph showing the 0.2% proof stress measurement results of electrical discharge machining electrode wires (core diameter: 0.25 mm) made at different annealing times and annealing temperatures. In FIGS. 2A and 2B, a plot at 25° C. is the measurement result of a non-annealed electrical discharge machining electrode wire.

Using a zinc electroplating method, a zinc plating layer having a thickness of about 10 μm was formed on a brass wire (diameter: 1.2 mm) as the core 1. The core 1 plated with zinc was drawn to a diameter of 0.20 mm (to 1.7 μm of the plating layer) or to a diameter of 0.25 mm (to 2.1 μm of the plating layer), was then wound onto a bobbin (F10: spindle diameter of 100 mm), and was annealed in this state, thereby making 10 kg each of electrical discharge machining electrode wires. The annealing conditions were 40 to 160° C. (40, 60, 80, 100, 120 or 160° C.) for 3 hours or for 8 hours.

It is understood from FIGS. 2A and 2B that, in both cases of using the core having a diameter of 0.20 mm (FIG. 2A) and 0.25 mm (FIG. 2B), electrode wires having a high 0.2% proof stress (985 to 1025 MPa) are obtained at an annealing temperature of 100 to 120° C. both when annealing time is 3 hours and 8 hours.

[Measurement and Examination of X-ray Diffraction Intensity]

Figure 3A:
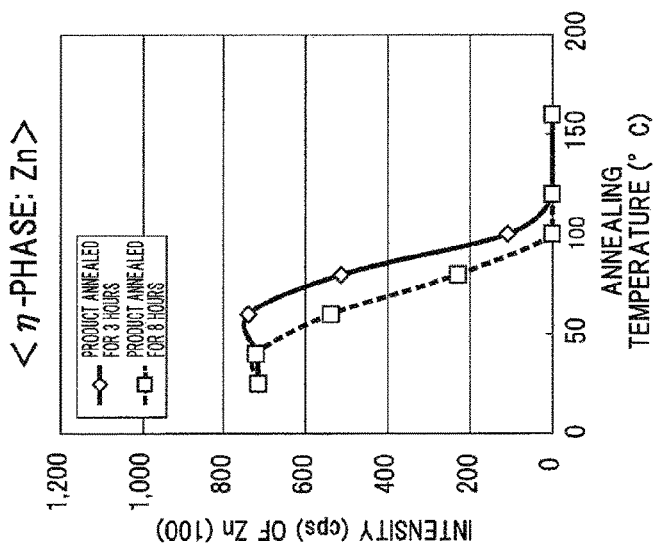
FIG. 3A is a graph showing intensity of (0001) of the ε-phase ($CuZn_5$) which is obtained by x-ray diffraction intensity measurement on the electrical discharge machining electrode wires (core diameter: 0.20 mm) made at different annealing times and annealing temperatures.
Figure 3B:
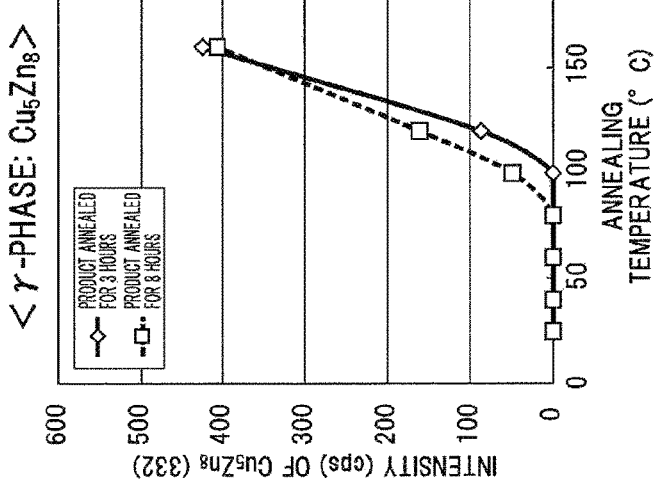
FIG. 3B is a graph showing intensity of (332) of the γ-phase (Cu₅Zn₈) which is obtained by x-ray diffraction intensity measurement on the electrical discharge machining electrode wires (core diameter: 0.20 mm) made at different annealing times and annealing temperatures.
Figure 3C:
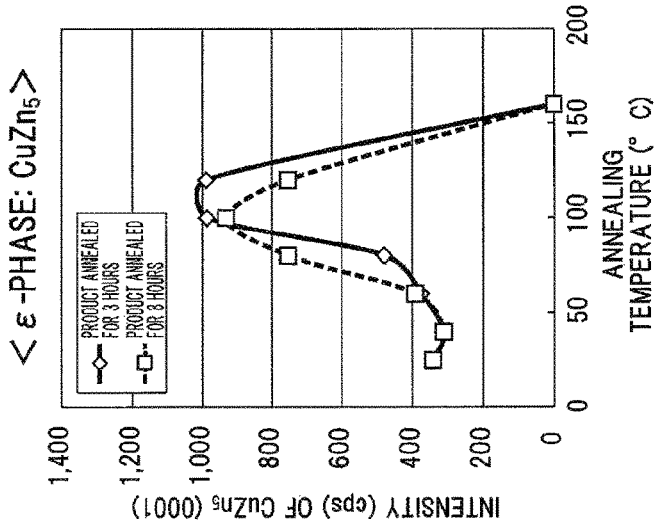
FIG. 3C is a graph showing intensity of (100) of the η-phase (Zn) which is obtained by x-ray diffraction intensity measurement on the electrical discharge machining electrode wires (core diameter: 0.20 mm) made at different annealing times and annealing temperatures.

Electrical discharge machining electrode wires were made by the following method and were subjected to x-ray diffraction intensity measurement using the previously described thin-film method (X-ray incident angle: 10°). FIGS. 3A to 3C show the results of x-ray diffraction intensity measured on the electrical discharge machining electrode wires (core diameter: 0.20 mm) made at different annealing times and annealing temperatures, wherein FIG. 3A is the result of measuring intensity of (0001) of the ε-phase ($CuZn_5$) in the covering layer, FIG. 3B is the result of measuring intensity of (332) of the γ-phase ($Cu_5Zn_8$) in the covering layer and FIG. 3C is the result of measuring intensity of (100) of the η-phase (Zn) in the covering layer. In FIGS. 3A to 3C, a plot at 25° C. is the measurement result of a non-annealed electrical discharge machining electrode wire.

Using a zinc electroplating method, a zinc plating layer having a thickness of about 10 μm was formed on a brass wire (diameter: 1.2 mm) as the core 1. The core 1 plated with zinc was drawn to a diameter of 0.20 mm (to 1.7 μm of the plating layer), was then wound onto a bobbin (F10: spindle diameter of 100 mm), and was annealed in this state, thereby making 10 kg each of electrical discharge machining electrode wires. The annealing conditions were 40 to 160° C. (40, 60, 80, 100, 120 or 160° C.) for 3 hours or for 8 hours.

It is understood from FIGS. 3A and 3B that, at the annealing temperature of not more than 120° C., the x-ray diffraction intensity of (0001) of the ε-phase is more than twice the x-ray diffraction intensity of (332) of the γ-phase when annealing time was 3 hours and also 8 hours. Meanwhile, an x-ray diffraction intensity of (100) of the η phase (Zn) was 0 when annealed at a temperature of 100° C. or more for 8 hours and when annealed at a temperature of 120° C. or more for 3 hours (FIG. 3C). The η-phase is a pure Zn phase and is likely produce abrasion powder due to its softness, which accumulates as debris on a pass line of an electrical discharge machine. Therefore, the η-phase is preferably eliminated by heat treatment, and it is understood that this requires heat treatment at not less than 100° C.

Based on the measurement results of 0.2% proof stress and x-ray diffraction intensity, heat treatment at 100 to 120° C. is optimal.

The invention is not intended to be limited to the embodiment and Examples, and the various kinds of modifications can be implemented.

REFERENCE SIGNS LIST

1 CORE
2 COVERING LAYER
2A INNER LAYER
2B OUTERMOST LAYER (ε-PHASE)
10 ELECTRODE WIRE

The invention claimed is:

1. An electrical discharge machining electrode wire, comprising:
a core comprising a copper or a copper alloy; and
a covering layer that covers a periphery of the core,
wherein the covering layer is consisted of an inner layer consisting of a γ-phase of copper and zinc provided on the core and an outermost layer consisting of an ε-phase of copper and zinc provided on the inner layer,
wherein the inner layer has a Cu concentration of 35 mass % to 45 mass %,
wherein the outermost layer has a Cu concentration of 12 mass % to 24 mass %, and
wherein the outermost layer has a Vickers hardness of 200 Hv to 300 Hv.

2. The electrical discharge machining electrode wire according to claim 1, wherein 0.2% proof stress is not less than 985 MPa.

3. The electrical discharge machining electrode wire according to claim 1, wherein an x-ray diffraction intensity of (0001) of the ε-phase in the covering layer is more than twice an x-ray diffraction intensity of (332) of the γ-phase in the covering layer.

4. The electrical discharge machining electrode wire according to claim 1, wherein the outermost layer has a Vickers hardness of 260 Hv to 300 Hv.

5. The electrical discharge machining electrode wire according to claim 1, wherein the core comprises a brass.

6. The electrical discharge machining electrode wire according to claim 1, wherein the inner layer, as a single layer, extends from an outer surface of the core to an inner surface of the outermost layer.

7. The electrical discharge machining electrode wire according to claim 1, wherein, in the electrical discharge machining electrode wire, the outermost layer is formed in a heat treatment in a range from 100° C. to 120° C.

8. The electrical discharge machining electrode wire according to claim 1, wherein the ε-phase is expressed as $CuZn_5$.

9. The electrical discharge machining electrode wire according to claim 1, wherein the ε-phase includes a layer covering an entire circumferential surface of the core.

10. The electrical discharge machining electrode wire according to claim 1, wherein the ε-phase is expressed as $CuZn_5$ and the γ-phase is expressed as $Cu_5Zn_8$.

11. The electrical discharge machining electrode wire according to claim 1, wherein the γ-phase is expressed as $Cu_5Zn_8$.

12. The electrical discharge machining electrode wire according to claim 1, wherein the electrical discharge machining electrode wire is produced by a zinc electroplating in which the covering layer is formed on a brass wire as the core and the core plated with zinc is drawn, wound onto a bobbin, and annealed in a predetermined temperature.

13. The electrical discharge machining electrode wire according to claim 12, wherein the predetermined temperature is in a range from 100° C. to 120° C.

* * * * *